US012680905B2

(12) United States Patent
　　Hunt et al.

(10) Patent No.:　US 12,680,905 B2
(45) Date of Patent:　　Jul. 14, 2026

(54) LEAKAGE DETECTION SYSTEM

(71) Applicant: Toshiba Global Commerce Solutions, Inc., Durham, NC (US)

(72) Inventors: Daniel Joseph Hunt, Wake Forest, NC (US); David John Steiner, Durham, NC (US); Craig Lynn Compton, Wake Forest, NC (US)

(73) Assignee: Toshiba Global Commerce Solutions, Inc., Durham, NC (US)

( * ) Notice: Subject to any disclaimer, the term of this patent is extended or adjusted under 35 U.S.C. 154(b) by 313 days.

(21) Appl. No.: 18/460,791

(22) Filed: Sep. 5, 2023

(65) Prior Publication Data

US 2025/0076147 A1　Mar. 6, 2025

(51) Int. Cl.
　　*G01M 3/32*　　　(2006.01)
　　*G01L 1/20*　　　　(2006.01)
(52) U.S. Cl.
　　CPC ............... *G01M 3/32* (2013.01); *G01L 1/205* (2013.01); *G01M 3/3209* (2013.01)

(58) Field of Classification Search
　　CPC ........ G01M 3/26; G01M 3/32; G01M 3/3209; G01L 1/00; G01L 1/205
　　See application file for complete search history.

(56) References Cited

U.S. PATENT DOCUMENTS

2010/0219958 A1　　9/2010　Caldwell
2017/0344935 A1*　11/2017　Mattingly ............ G06Q 10/087

FOREIGN PATENT DOCUMENTS

WO　　　　2017183038 A1　10/2017

* cited by examiner

*Primary Examiner* — Benjamin R Schmitt
(74) *Attorney, Agent, or Firm* — Stanek Lemon Crouse & Meeks, PA

(57) ABSTRACT

Systems, methods, and computer-readable media for detecting a leakage condition are provided. In one embodiment, a container integrity system can obtain sensor data associated with a sensor pad placed on or integrated with shelves or similar surfaces. Containers or items susceptible to leakage can be positioned on the sensor pad, and sensors distributed throughout the sensor pad can measure force profiles exerted by the items. The container integrity system can identify the presence or absence of a leakage condition using the sensor data from the sensor pad.

17 Claims, 4 Drawing Sheets

KEY

PRESSURE = X

PRESSURE = Y

PRESSURE = Z

100

502 ~ OBTAIN SENSOR DATA INDICATIVE OF FORCES EXERTED ON A SENSOR PAD

504 ~ IDENTIFY A FORCE PROFILE CORRESPONDING TO A PRESENCE OF A CONTAINER POSITIONED ATOP THE SENSOR PAD

506 ~ DETERMINE A PRESENCE OF A LEAKAGE CONDITION

508 ~ ASSOCIATE THE LEAKAGE CONDITION WITH THE CONTAINER

LEAKAGE DETECTION SYSTEM

BACKGROUND

In retail settings, shelves commonly serve as platforms for the display and potential sale of merchandise. While this configuration offers visual appeal and ease of access for customers, it poses management complexities, especially for products that are not readily visible. One notable concern is the difficulty in promptly detecting and isolating damaged products within this configuration. Packaging leaks can arise from various factors including stocking errors, inadvertent damage, or customer interactions. Prompt identification and mitigation of such incidents can be important to prevent a range of adverse outcomes. These include immediate safety concerns like slippery floors, as well as more subtle, long-term repercussions. When merchandise is densely packed on shelves, a leak from one item can adversely impact surrounding goods, resulting in spoilage, reduced stock availability, and unsightly clutter requiring clean-up. Such occurrences can also erode customer trust in both the product and the retail environment, highlighting the need for vigilant oversight and timely intervention to maintain the display's integrity.

BRIEF DESCRIPTION OF THE DRAWINGS

Throughout the drawings, reference numbers can be reused to indicate correspondence between referenced elements. The drawings are provided to illustrate embodiments of the present disclosure and do not to limit the scope thereof.

DETAILED DESCRIPTION

Some of the inventive concepts relate to a smart mat system designed for grocery shelves. The mats can be strategically placed on shelves under items like cleaning agents, beverages, or other items susceptible to spills or leaks. The mats can have built-in sensors that can detect changes in the item's weight. If an item starts to leak, the smart mat system picks up the change in weight and sends out an alert. The smart mat system can quickly identify and address spills, serving as a tool for maintaining clean and safe conditions in stores or other environments.

The inventive concepts can address the persistent issue of spills and leaks in grocery stores, which can lead to safety hazards and waste. Traditional methods usually involve manual checks, which are time-consuming and can be unreliable. The smart mat system can be placed under products prone to spills and, by monitoring weight changes through the force-measuring sensors, the smart mat system can promptly detect any leaks and alert staff, allowing for timely intervention to prevent further spillage or accidents.

The present inventive concepts relate to systems, methods, and computer-readable media for identifying and associating a leakage condition with containers displayed on sensor-equipped shelving units. The system can include a sensor pad having a plurality of force-measuring sensors. These sensors can be distributed in various configurations such as linear arrays, radial patterns, or uniformly dispersed arrangements, with each sensor configured to measure forces exerted upon it. The force-measuring sensors can be of multiple types, including but not limited to load sensors, weight sensors, pressure sensors, and piezoelectric sensors. One or more processors are communicatively coupled to the sensor pad and are configured to obtain and analyze sensor data indicative of forces exerted on the sensor pad.

The inventive concepts disclosed herein address the deficiencies of existing shelving management systems by enabling real-time detection and alerting of leakage conditions. When a container is positioned atop the sensor pad, a force profile can be identified and monitored over time. A container integrity system can be configured to determine the presence of specific conditions characterized by changes in this force profile, which can be indicative of a leak. Various mechanisms can be implemented to differentiate between genuine leaks and false alarms such as the removal of an item from the shelf. Moreover, the container integrity system can identify variations in force across adjacent sensors, thereby alerting of possible external fluid accumulation or leakage affecting neighboring items. Upon identification of a leakage condition, an alarm condition can be triggered, which can include auditory alerts, visual alerts, or notifications sent to designated recipients.

Figure 1:
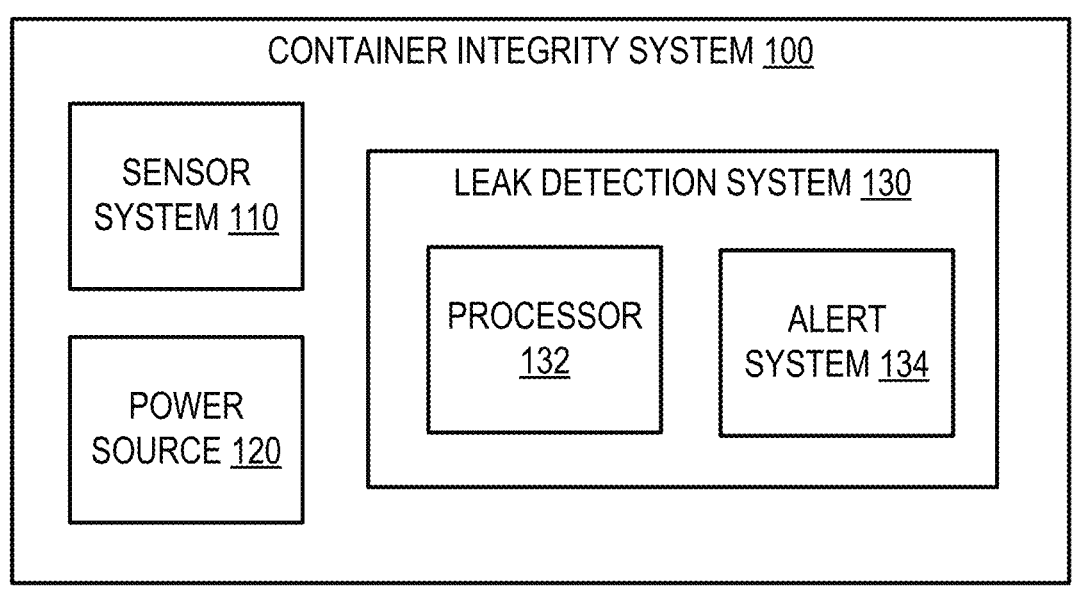
FIG. 1 illustrates a block diagram of a container integrity system.

FIG. 1 illustrates a block diagram of a container integrity system 100 for identifying leak conditions. The container integrity system 100 includes a sensor system 110, a power source 120, and a leak detection system 130. The leak detection system 130 includes a processor 132 and an alert system 134.

Any of the foregoing components or systems of the container integrity system 100 may communicate via a network (not shown). The network can include any type of communication network. For example, the network can include one or more of a wide area network (WAN), a local area network (LAN), a cellular network, an ad hoc network, a satellite network, a wired network, a wireless network, and so forth. In some embodiments, the network can include the Internet.

Any of the foregoing components or systems of the container integrity system 100 may be implemented using individual computing devices, processors, distributed processing systems, servers, isolated execution environments (e.g., virtual machines, containers, etc.), shared computing resources, or the like.

In at least one embodiment, some or all of the sensor system 110, the power source 120, the leak detection system 130, the processor 132, or the alert system 134 can form part of a single device. In addition or alternatively, one or more of the sensor system 110, the power source 120, the leak detection system 130, the processor 132, or the alert system 134 can be a separate device or system. Regardless of the configuration, one, some, or all of the sensor system 110, the power source 120, the leak detection system 130, the processor 132, or the alert system 134 can include one or more processors and/or a computer-readable medium that stores specific computer-executable instructions for carrying out the operations described herein.

The sensor system 110 captures data related to force, weight, pressure, or shear forces. For example, the sensor system 110 can include a set of force-measuring sensors which can include, but are not limited to, load sensors, weight sensors, scales, pressure sensors, piezoresistive sensors, piezoelectric sensors, capacitive sensors, strain gauge sensors, fluid-based sensors, magnetic sensors, and Hall Effect sensors. In some cases, the sensor system 110 can measure a rate of change in these metrics, directional force vectors, or the distribution of load across multiple sensor points. In some embodiments, the sensor system 110 captures a rate at which force or pressure increases or decreases. In some embodiments, the sensor system 110 captures data on the directional vectors of applied forces.

The sensor system 110 can obtain sensor data that is usable for determining a force profile of one or more items placed upon it. A force profile, which can vary across embodiments, may take the form of a high-resolution, two-dimensional pressure map, revealing an intricate force or weight distribution exerted on the sensor system 110. The force-measuring sensors within the sensor system 110 can be arrayed with various configurations of pitch and resolution to suit different application requirements. For instance, the sensors can be aligned at pitches of 1 mm, 2 mm, or 5 mm. Similarly, different resolutions such as 0.01 N, 0.05 N, and 0.1 N can be employed for capturing force data. These pitch and resolution options allow for capturing of detailed force data at distinct points across the container, facilitating the precise identification of any alterations in force that could signify a leakage condition.

The implementation of the sensor system 110 can vary across embodiments. In some cases, the sensor system 110 is implemented as a sensor pad. The term "sensor pad" is used broadly herein to refer to any set of sensors 220 usable for the identification of leakage conditions. In some cases, the sensor pad takes the form of a rollable sheet, facilitating easy deployment. In some cases, the sensor pad includes a thin mat adaptable to diverse surfaces or as a detachable overlay readily positionable on shelves in environments such as retail or grocery stores. In some cases, forms of the sensor pad can include rigid panels or fixed platforms. Individual sensor pads within the sensor system 110 can be interconnected, thereby enabling comprehensive surface area coverage for monitoring activities across extensive settings.

The sensor system 110 can include a variety of sensor layouts within the sensor pads. Examples of these layouts include linear arrays, radial patterns, uniform dispersion, staggered configurations, and grid patterns. In some cases, industrial storage facilities may utilize sensor pads with uniformly dispersed piezoelectric sensors. In other instances, such as in grocery or retail settings, sensor pads with linear arrays of capacitive sensors may be used. Additional configurations can involve a radial pattern of magnetic sensors or a grid arrangement of pressure sensors.

The power source 120 can supply energy to the sensor system 110 and/or the leak detection system 130. Powering options of the power source 120 can include, but are not limited to, batteries, solar panels, fuel cells, or direct electrical connection to an external power grid. In some cases, the power source 120 manifests as a portable unit, offering enhanced mobility. In some cases, the power source 120 can incorporate multiple battery packs to ensure sustained operation or facilitate hot-swapping during active monitoring phases.

The leak detection system 130 can identify leakage conditions suggestive of leaks within containers by analyzing sensor data obtained by the sensor system 110. The leak detection system 130 is communicatively coupled to the sensor system 110, thereby enabling the acquisition of real-time or near-real-time force data for assessment. Within this framework, the leak detection system 130 can apply various algorithms to determine and/or examine force profiles and identify irregularities or patterns indicative of a leakage condition. The leak detection system 130 can include a processor 132 and/or an alert system 134.

The processor 132 can be communicatively coupled to the sensor system 110, facilitating real-time acquisition and analysis of sensor data. The processor 132 can be configured to collate high-fidelity data points reflecting forces exerted upon the sensor system 110. Furthermore, the processor 132 can intelligently identify distinct force profiles, each corresponding to specific containers situated atop the sensor system 110. These force profiles can serve as a basis for ascertaining various conditions, particularly those that may signal impending leakage events. Upon identification of such conditions, the processor 132 can trigger the alert system 134, thereby enabling notification and prompt remedial action.

The processor 132 can determine the presence or absence of a leakage condition based on the presence of absence of leakage criteria. In at least some embodiments, the leakage criteria relate to force measurements captured by sensors positioned beneath a specific container. For example, the processor 132 can determine a leak condition based on a determination that force values captured by sensors positioned beneath the container are decreasing over time, indicating a leak. In some such cases, the leakage criteria can be characterized by a decremental change in force values over a predefined time interval.

In some instances, a decremental change in force can be attributable to factors other than leakage, such as manual lifting of the container. To mitigate false alarms, the processor 132 can be configured to employ a lower force threshold and/or a null force threshold. For example, the processor 132 can determine that a decremental change in force, which traverses the lower force threshold but not the null force threshold, meets the criteria for a leakage condition. Conversely, a decremental change crossing the null force threshold can fail to meet these criteria. In this context, crossing the null force threshold can serve as an indication that the container has been lifted off the sensor pad, rather than confirming a leakage condition.

In some cases, the leakage criteria for identifying a leakage condition can be based on force measurements from sensors not directly beneath the container in question but adjacent to it. For instance, the processor 132 can be configured to ascertain a leakage condition by evaluating an incremental trend in force values acquired by a second set of force-measuring sensors. These sensors can be spatially adjacent to, yet distinct from, the original subset positioned beneath the container. In some such cases, the leakage criteria can include various force-related parameters, such as transitions from null or near-null force values to non-null values or incremental increases in the force data across this secondary set of sensors. For example, when the processor 132 identifies a shift from null or near-null to non-null force values across this secondary sensor set, the processor 132 can determine that the criteria for a leakage condition are met. Such an increase in force can signify external fluid accumulation, thereby leading the processor 132 to associate this change with a leakage condition.

In one example, the criteria for identifying a leakage condition can include comparing the force profile of the container under evaluation with those of other containers that are substantially similar and may also be situated on the sensor system 110. The processor 132 can be configured to determine a leakage condition when the force profile of the container being assessed diverges by a threshold amount— such as by more than 2%, 5%, 7%, 10%, 20%, or 30%— from the profiles of similar containers, based on a predefined threshold or time period. Such pronounced divergence can be indicative of meeting the criteria for a leakage condition, leading the processor 132 to associate this observed divergence with a potential leakage condition.

When the processor 132 associates a container with a leakage condition, the processor 132 can activate the alert system 134 to notify relevant parties. This action by the processor 132 can facilitate corrective measures to mitigate the consequences of the leakage condition.

The alert system 134 is communicatively coupled with the processor 132 and can provide an indication of leakage conditions. The alert system 134 can activate notifications using any of various methods including, but not limited to, audible alerts, tactile alerts, visible alerts, or messages sent to specific people. In some cases, the alert system 134 can provide an indication of location details relating to the leak, making it easy for quick mitigation.

Figure 2:
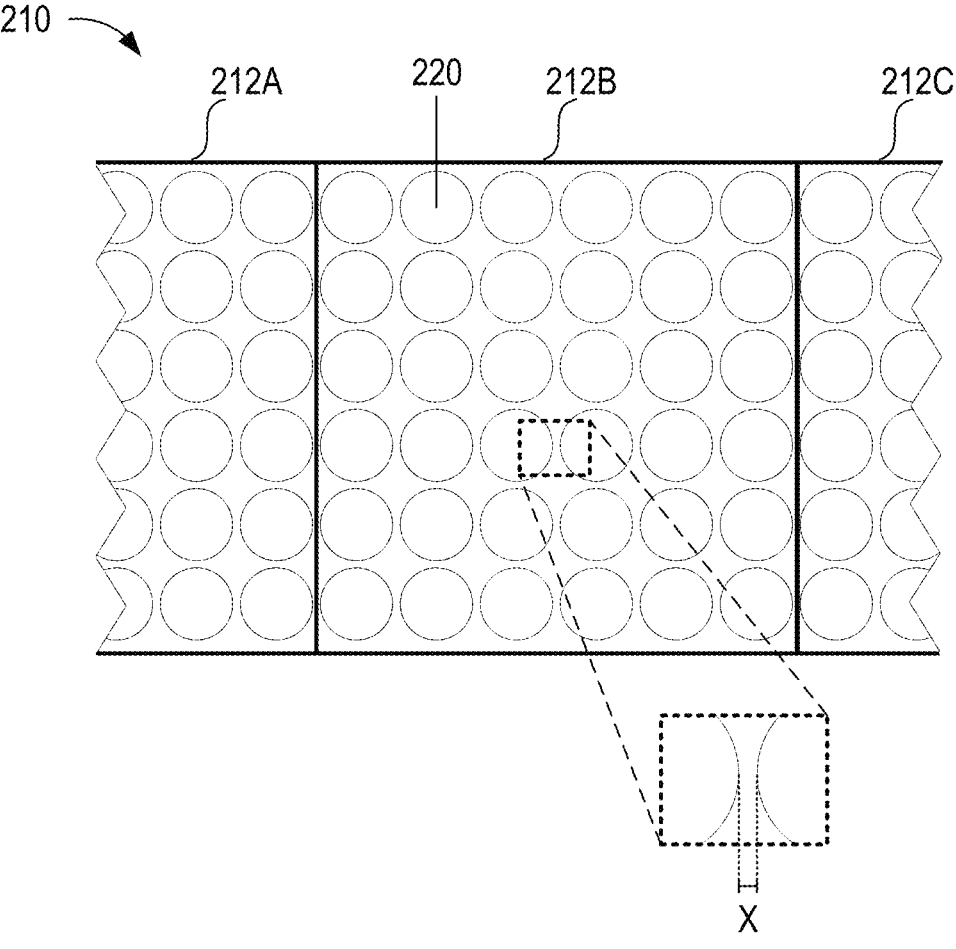
FIG. 2 illustrates an example sensor system.

FIG. 2 provides a visual representation of an example sensor system 210 that includes multiple interconnected sensor pads 212A, 212B, 212C (collectively referred to as sensor pad 212 or sensor pads 212). This configuration demonstrates a practical implementation of the sensor system 210, which can be an embodiment of the sensor system 110 of FIG. 1.

Within each sensor pad 212, the arrangement of sensors 220 can facilitate accurate force measurements, enabling the sensor system 210 to effectively evaluate objects placed on it. In the illustrated example of FIG. 2, the sensors 220 are organized in linear arrays, each consisting of six sensors, resulting in a cumulative count of 36 sensors within the sensor pad 212. The composition of linear arrays and the number of sensors in each can vary across embodiments, accommodating diverse applications. Moreover, the disposition of sensors 220 may vary across embodiments. For instance, some embodiments may include sensors arranged in a radial pattern within the sensor pad 212. As another example, some embodiments may include sensors arranged in a non-uniform distribution. Furthermore, it will be appreciated that the sensor pads 212 may be diverse from each other, encompassing variations such as differing sizes or sensor layouts.

The spacing, X, between adjacent sensors 220 can vary across embodiments. In some cases, the spacing can be relatively small, which translates to sensors 220 being positioned closer together on the sensor pad 212, resulting in a higher sensor density. For instance, in some cases, the edge-to-edge spacing between adjacent sensors 220 can be less than 2 cm, less than 1 cm, less than 8 mm, less than 5 mm, less than 3 mm, less than 2 mm, less than 1 mm, or less than 0.5 mm (+/− about 0.25 mm). This can be referred to as having a low pitch. Such precision can contribute to the effectiveness of the container integrity system 100 in detecting subtle force changes, which could indicate conditions such as leaks. Alternatively, in some cases, the spacing can be relatively large, which translates to sensors 220 being positioned further apart on the sensor pad 212, resulting in a lower sensor density. For instance, in some cases, the edge-to-edge spacing between adjacent sensors 220 can exceed 5 cm, 3 cm, 1 cm, 5 mm, or 2 mm (+/− about 0.5 mm).

Figure 3:
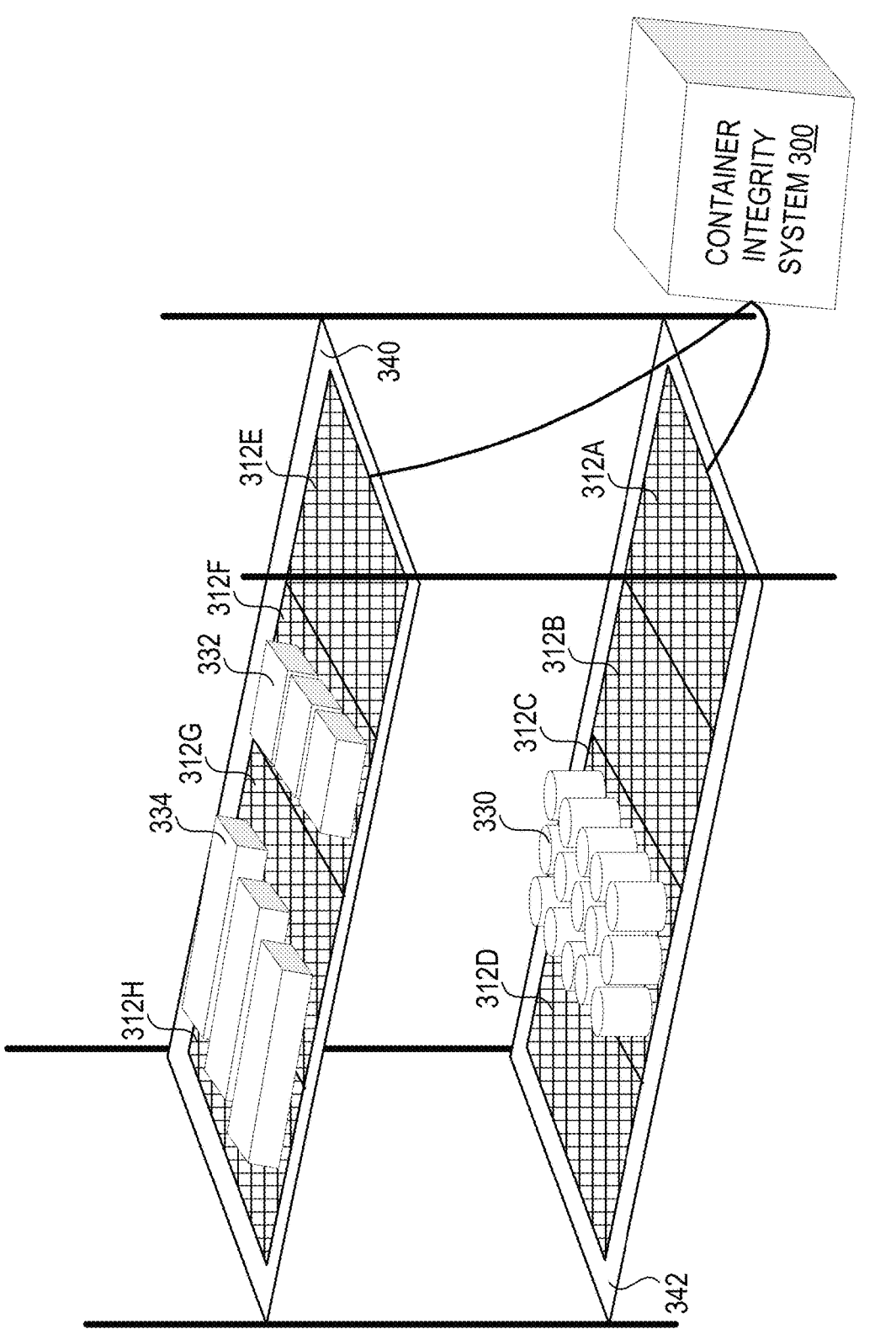
FIG. 3 illustrates an environmental view of example sensor system arranged along shelving and having items positioned thereon.

FIG. 3 illustrates an environmental view of a container integrity system 300. In this example the sensor system 310 is separate from, but communicatively coupled with, the container integrity system 300. The sensor system 310 and the container integrity system 300 are embodiments of the sensor system 110 and the container integrity system 100 of FIG. 1.

The sensor system 310 eight sensor pads 312A, 312B, 312C, 312D, 312E, 312F, 312G, 312G, 312H (individually or collectively referred to as sensor pads 312). The sensor pads 312 are interconnected and arranged across an upper shelf 340 and a lower shelf 342.

In this example, a collection of first items 330 (shown as cans) is positioned on the lower shelf 342 and positioned atop the sensor pad 312A, a collection of second items 332 (shown as boxes) is positioned on the upper shelf 340 and positioned atop the sensor pad 312B, and a collection of third items 334 (shown as boxes) is positioned on the upper shelf 340 and positioned across the sensor pads 312C and 312D.

As described herein, the sensor pads 312 include force-measuring sensors distributed throughout their surfaces, enable the container integrity system 300 to accurately identify the presence of the first items 330, the second items 332, and the third items 334. As the first items 330, the second items 332, and the third items 334 are individually placed on the sensor pads 312, a change in force distribution is detected. This change in force profile serves as an indicator, signifying the placement of items and can prompt the container integrity system 300 to initialize monitoring processes.

As described herein, the container integrity system 300 can discern the positioning of the first items 330, the second items 332, and the third items 334 on the sensor pads 312. Furthermore, the container integrity system 300 can also to detect potential spills that may occur. For example, through the continuous or periodic monitoring of force changes on the sensor pads 312, the container integrity system 300 can identify deviations from baseline force profiles associated with the items' placement. Such deviations can indicate spill events, enabling the container integrity system 300 to trigger alerts or notifications, thereby ensuring proactive responses to mitigate potential risks.

Figure 4A:
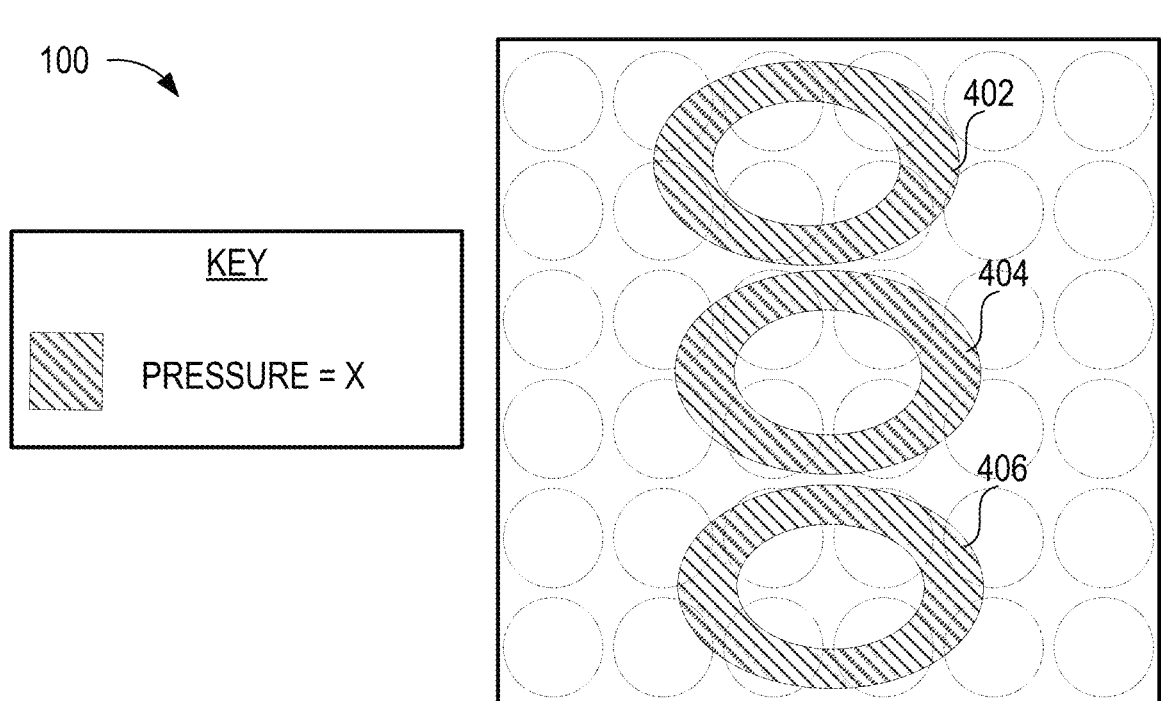
FIG. 4A depicts a 2D pressure footprint map that corresponds to a sensor pad, providing an illustrative example of non-leaking container footprints.

FIG. 4A depicts a two-dimensional (2D) pressure footprint map as generated by a container integrity system 100 equipped with a plurality of force-measuring sensors, providing an illustrative example of non-leaking container footprints. In this instance, three detergent containers are positioned atop the sensor pad. Each container is associated with a distinct force profile on the 2D pressure map, namely force profile 402, 404, and 406. Notably, all three force profiles 402, 404, and 406 demonstrate a donut-shaped configuration, indicative of a stable, non-leaking state for each of the containers. The uniformity of the force profiles 402, 404, and 406 can serve as a baseline condition, signifying that none of the detergent containers is experiencing a leakage condition at this juncture.

Figure 4B:
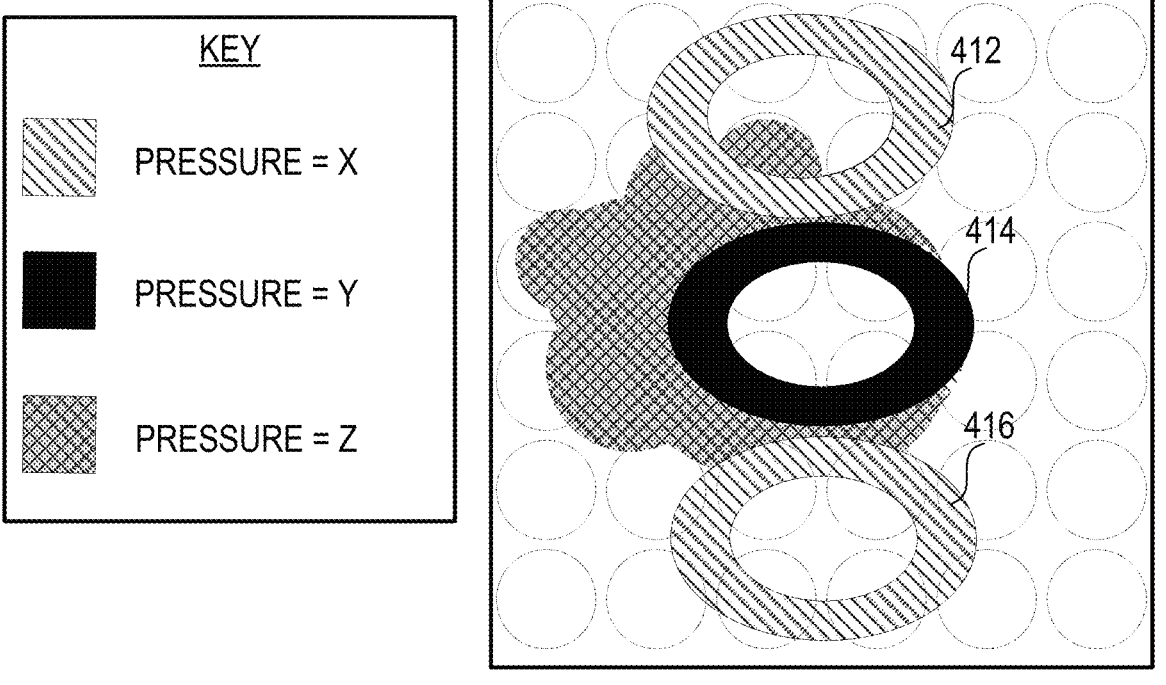
FIG. 4B depicts a 2D pressure footprint map that corresponds to a sensor pad, providing an illustrative example of leaking container footprints.

In contrast, FIG. 4B portrays another 2D pressure footprint map, similarly generated by the sensor system, providing an illustrative example of leaking container footprints. Specifically, this map reveals discrepancies in the force profiles 412, 414, 416 associated with the three detergent containers. For the second container, the force profile 414 exhibits a distinct variance compared to those force profiles 412, 416 of the first and third containers. For example, in FIG. 4B, pressure measurements are denoted by variables "X," "Y," and "Z," where pressure "X" is greater than pressure "Y," which is greater than pressure "Z." As such, the map shows that the force profiles are no longer uniform, as they are in FIG. 4A. Rather, the force profile 414 is less pressure than the force profiles 412, 416. This is indicative of a leakage condition affecting the second container. Furthermore, the map shows that force measurements on sensors immediately adjacent to the footprint of the second container have also changed, signifying that the leakage has extended to affect other proximate sensors. This nuanced information confirms that the container integrity system 100 can effectively identify and characterize a leakage condition based on deviations in force profiles.

In at least some implementations, the container integrity system 100 can be configured to analyze the 2D pressure footprint maps in a manner akin to image analysis techniques. Effectively, the container integrity system 100 treats these 2D maps as though they are graphical images, deploying computational methods such as edge detection, contour mapping, and pixel intensity variations to scrutinize the spatial distribution of force across the sensor pad. This analytical approach can allow the container integrity system 100 to detect subtle shifts or anomalies in force profiles with greater precision. For instance, this image-based interpretation can discern gradual or abrupt changes in the force exerted across multiple sensors, making it possible to detect early-stage leakage conditions with a higher degree of confidence. Through this method, the container integrity system 100 enhances the reliability and granularity of its condition-monitoring capabilities, thereby facilitating more timely and accurate notifications via the alert system 134.

Figure 5:
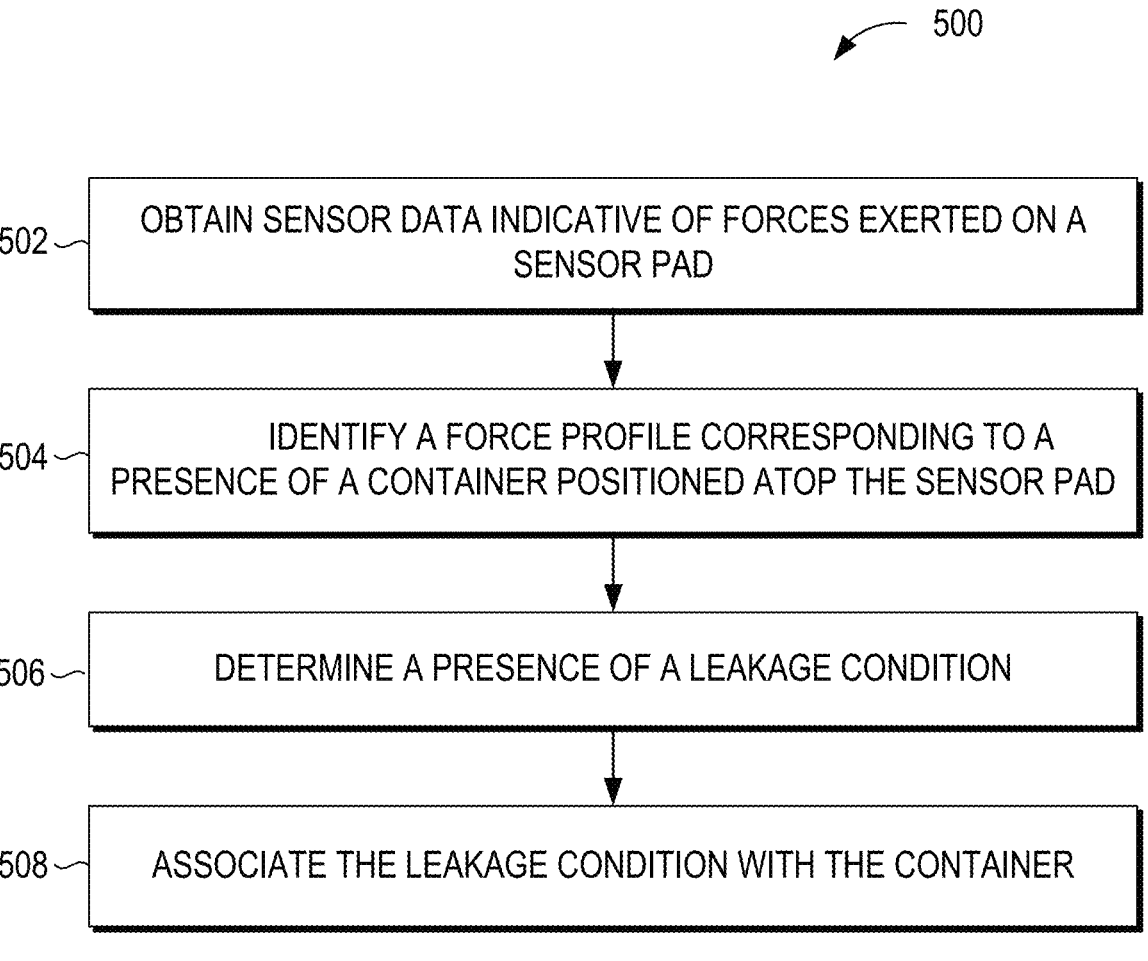
FIG. 5 is a flow diagram illustrating an embodiment of a routine for identifying a leakage condition in a container positioned on a sensor pad.

FIG. 5 is a flow diagram illustrating an embodiment of a routine 500 for identifying a leakage condition in a container positioned on a sensor system. The elements outlined for routine 500 can be implemented by one or more computing devices that are associated with the container integrity system 100, such as the processor 132. Accordingly, routine 500 has been logically associated as being generally performed by the processor 132, but the following illustrative example should not be construed as limiting.

At block 502, the processor 132 obtains sensor data that is indicative of forces exerted on a sensor pad by a container placed thereon. Example containers include items holding materials in a flowable state such as, but are not limited to, detergent bottles, shampoo bottles, condiment jars, milk jugs, juice cartons, olive oil bottles, aerosol cans, soda cans, water bottles, laundry detergent pods in plastic bags, dish soap bottles, yogurt containers, sour cream tubs, liquid hand soap dispensers, antifreeze containers, motor oil bottles, baby food jars, squeezable jelly containers, salad dressing bottles, wine bottles, bleach containers, household cleaner spray bottles, vinegar bottles, bottled iced tea, coffee creamer bottles, meat marinade bottles, ketchup and mustard containers, pancake syrup bottles, pet shampoo bottles, liquid plant food bottles, windshield wiper fluid jugs, or paint cans.

The sensor pad can be an embodiment of the sensor system 110 of FIG. 1. For example, the sensor pad can be configured with a plurality of force-measuring sensors, each of which is designed to measure the force exerted upon it. In some cases, these force-measuring sensors may be aligned in linear arrays within the sensor pad. In other instances, the force-measuring sensors can be organized in a radial pattern. Alternatively, the sensors may be uniformly dispersed throughout the sensor pad. When the container is positioned atop the sensor pad, a force profile can be identified and monitored over time.

At block 504, the processor 132 identifies a force profile distributed across a subset of the force-measuring sensors. The force profile is indicative of the presence of the container that is positioned atop the sensor pad. In some cases, the force profile might correspond to unique characteristics of the container, such as its shape, size, or the nature of its contents. The identified force profile can serve as a basis for further analysis aimed at determining whether any leakage conditions exist.

At block 506, the processor 132 assesses the sensor data and/or the force profile to determine the presence of a first condition. This first condition can be characterized by a temporal variation in the previously identified force profile. For example, the processor 132 can detect a decremental change in force across a subset of force-measuring sensors over a predefined first time period. Such a decremental change can be indicative of a leak. In some instances, the processor 132 can consider force thresholds to validate the first condition. A lower force threshold and a null force threshold can be defined, and the first condition can be considered present when the decremental change in force crosses the lower force threshold but does not cross the null force threshold. Crossing the null force threshold can signify the removal of the container from the sensor pad, negating the first condition.

In some embodiments, the first condition can be characterized by a variation in force across a second set of force-measuring sensors. These sensors can be in immediate spatial adjacency to, yet distinct from, the initial subset of force-measuring sensors that contributed to the original force profile. This variation can manifest as a transition from a null or near-null force measurement to a non-null force measurement, which can be indicative of fluid leakage. Alternatively, the variation can correspond to an incremental increase in the measured force across this second set of force-measuring sensors, indicative of external fluid accumulation.

At block 508, the processor 132 can be configured to associate a leakage condition with the container, based on the identified first condition and/or any other corroborative sensor data. In some cases, this association involves the triggering of an alarm condition. The processor 132 can initiate this alarm condition, which can comprise various forms of alert mechanisms. These mechanisms can include, but are not limited to, an auditory alert, a visual alert, or a transmission of a notification to a designated recipient. The purpose of initiating this alarm condition can be to signal the probable uncontrolled egress of materials in a flowable state from the container.

It will be understood that the described routine 500 can include more, different, or fewer blocks than those explicitly enumerated. For example, in some cases, the processor 132 can identify additional force profiles, distributed across supplementary subsets of the force-measuring sensors. These additional force profiles may correspond to the presence of other containers, such as those substantially similar to the container of interest, positioned atop the sensor pad. Subsequent to this identification, the processor 132 can compare the initial force profile with these additional force profiles. In some such cases, the first condition may be characterized by a determination that the initial force profile diverges from these additional force profiles over a predefined duration or threshold value. In some instances, the additional force profiles are analyzed for consistency prior to their comparison with the initial force profile. This precomparison analysis can serve to establish a baseline condition, against which deviations in the initial force profile can be more accurately assessed.

Terminology

It is understood by those skilled in the art that the disclosure extends beyond the specifically disclosed embodiments to other alternative embodiments and/or uses and obvious modifications and equivalents thereof. In addition, while several variations of the embodiments of the disclosure have been shown and described in detail, other modifications, which are within the scope of this disclosure, will be readily apparent to those of skill in the art. It is also contemplated that various combinations or sub-combinations of the specific features and aspects of the embodiments may be made and still fall within the scope of the disclosure. For example, features described above in connection with one embodiment can be used with a different embodiment described herein and the combination still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above. Accordingly, unless otherwise stated, or unless clearly incompatible, each embodiment of this present disclosure may include, additional to its essential features described herein, one or more features as described herein from each other embodiment of the present disclosure disclosed herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, features that are described in this disclosure in the context of separate implementations can also be implemented in combination in a single implementation. Conversely, various features that are described in the context of a single implementation can also be implemented in multiple implementations separately or in any suitable sub-combination. Moreover, although features may be described above as acting in various combinations, one or more features from a claimed combination can, in some cases, be excised from the combination, and the combination may be claimed as a subcombination or variation of a sub combination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some cases, the actual steps taken in the processes illustrated and/or disclosed may differ from those shown in the figures. In at least some examples, the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey cases include, while other embodiments do not include, features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain cases require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A system comprising:
a sensor pad configured with a plurality of force-measuring sensors distributed throughout the sensor pad, wherein each force-measuring sensor is configured to measure a force exerted on a respective force-measuring sensor;
one or more processors communicatively coupled to the sensor pad, the one or more processors configured to:
determine sensor data indicative of forces exerted on the sensor pad;
identify a force profile distributed across a subset of the force-measuring sensors, the force profile corresponding to a presence of a container positioned atop the sensor pad;
determine a presence of a first condition, wherein the first condition is characterized by a change in the force profile over time,
wherein the change in the force profile over time manifests as a decremental change in force across the subset of force-measuring sensors over a first time period, the decremental change being indicative of a leak; and
based on the presence of the first condition, associate a leakage condition with the container.

2. The system of claim 1, wherein the first condition corresponds to a lower force threshold and a null force threshold, the first condition being present when the force profile exhibits a decremental change that crosses the lower force threshold but does not cross the null force threshold, a crossing of the null force threshold being indicative of removal of the container from the sensor pad.

3. The system of claim 1, wherein the first condition is characterized by a variation in force across a second set of force-measuring sensors that are in immediate spatial adjacency to, yet distinct from, the subset of force-measuring sensors.

4. The system of claim 3, wherein the variation includes a transition from a null or near-null force measurement to a non-null force measurement across the second set of force-measuring sensors, the transition being indicative of fluid leakage.

5. The system of claim 3, wherein the variation corresponds to an incremental increase in the measured force across the second set of force-measuring sensors, the incremental increase being indicative of external fluid accumulation.

6. The system of claim 1, wherein the one or more processors are further configured to:
identify second force profiles distributed across additional subsets of the force-measuring sensors, the second force profiles corresponding to a presence of other containers substantially similar to the first container and positioned atop the sensor pad; and
compare the first force profile with the second force profiles,
wherein the first condition is characterized by a determination that the first force profile diverges from the second force profiles over a predefined duration or threshold.

7. The system of claim 6, wherein the second force profiles are analyzed for consistency prior to comparison with the first force profile to establish a baseline condition.

8. The system of claim 1, wherein the force-measuring sensors are aligned in linear arrays within the sensor pad.

9. The system of claim 1, wherein the force-measuring sensors are organized in a radial pattern within the sensor pad.

10. The system of claim 1, wherein the force-measuring sensors are uniformly dispersed throughout the sensor pad.

11. The system of claim 1, wherein a distance between adjacent force-measuring sensors within the sensor pad is less than 2 mm.

12. The system of claim 1, wherein the force-measuring sensors include a load sensor, weight sensor, scale, pressure sensor, piezoresistive sensor, piezoelectric sensor, capacitive sensor, strain gauge sensor, fluid-based sensor, magnetic sensor, or Hall Effect sensor.

13. The system of claim 1, wherein the container holds materials in a flowable state, and wherein the leakage condition is indicative of a probable condition under which the materials in the flowable state are undergoing an uncontrolled egress from the container.

14. The system of claim 1, wherein to associate the leakage condition with the container, the one or more processors are configured to trigger an alarm condition, the alarm condition comprising an auditory alert, a visual alert, or a transmission of a notification to a designated recipient, the alarm condition serving to signify the probable uncontrolled egress of materials in a flowable state from the container.

15. A method, comprising:
obtaining sensor data indicative of forces exerted on a sensor pad, the sensor pad configured with a plurality of force-measuring sensors distributed throughout the sensor pad, wherein each force-measuring sensor is configured to measure a force exerted thereupon;
identifying a force profile distributed across a subset of the force-measuring sensors, the force profile corresponding to a presence of a container positioned atop the sensor pad;
determining a presence of a first condition, wherein the first condition is characterized by at least one of a decremental change in force across the subset of the force-measuring sensors that crosses a lower force threshold but does not cross a null force threshold, the null force threshold corresponding to a removal of the container from the sensor pad; or
an incremental change in force across a second set of force-measuring sensors that are in immediate spatial adjacency to, yet distinct from, the subset of force-measuring sensors, wherein the incremental increase includes a transition from a null or near-null force measurement to a non-null force measurement across the second set of force-measuring sensors; and
based on the presence of the first condition, associating a leakage condition with the container.

16. The method of claim 15, further comprising:
identifying second force profiles distributed across additional subsets of the force-measuring sensors, the second force profiles corresponding to a presence of other containers substantially similar to the first container and positioned atop the sensor pad; and
comparing the first force profile with the second force profiles,
wherein the first condition is characterized by a determination that the first force profile diverges from the second force profiles.

17. Non-transitory computer-readable media storing computer executable instructions that when executed by one or more processors cause the one or more processors to:

obtain sensor data indicative of forces exerted on a sensor pad, a sensor pad configured with a plurality of force-measuring sensors distributed throughout the sensor pad, wherein each force-measuring sensor is configured to measure a force exerted thereupon;

identify a force profile distributed across a subset of the force-measuring sensors, the force profile corresponding to a presence of a container positioned atop the sensor pad;

determine a presence of a first condition, wherein the first condition is characterized by at least one of a decremental change in force across the subset of the force-measuring sensors that crosses a lower force threshold but does not cross a null force threshold, the null force threshold corresponding to a removal of the container from the sensor pad; or an incremental change in force across a second set of force-measuring sensors that are in immediate spatial adjacency to, yet distinct from, the subset of force-measuring sensors, wherein the incremental increase includes a transition from a null or near-null force measurement to a non-null force measurement across the second set of force-measuring sensors; and associate a leakage condition with the container.

\* \* \* \* \*